US011655108B2

(12) United States Patent
Pacheco et al.

(10) Patent No.: US 11,655,108 B2
(45) Date of Patent: May 23, 2023

(54) ROTATING DRUM FOR GRAVITY FEEDING MATERIAL INTO ITS INTERIOR

(71) Applicant: ECOHISPANICA I MAS D MEDIOAMBIENTAL, S.L., Rivas-Vaciamadrid (ES)

(72) Inventors: Jesus Pacheco, Rivas-Vaciamadrid (ES); Julian Alberto Soler, Rivas-Vaciamadrid (ES)

(73) Assignee: ECOHISPANICA I MAS D MEDIOAMBIENTAL, S.L., Rivas-Vaciamadrid (ES)

( * ) Notice: Subject to any disclaimer, the term of this patent is extended or adjusted under 35 U.S.C. 154(b) by 0 days.

(21) Appl. No.: 17/286,740

(22) PCT Filed: Oct. 17, 2018

(86) PCT No.: PCT/ES2018/070677
§ 371 (c)(1),
(2) Date: Apr. 19, 2021

(87) PCT Pub. No.: WO2020/079289
PCT Pub. Date: Apr. 23, 2020

(65) Prior Publication Data
US 2021/0371217 A1   Dec. 2, 2021

(51) Int. Cl.
*B65G 65/32* (2006.01)
*B65G 33/14* (2006.01)
*B09B 3/45* (2022.01)

(52) U.S. Cl.
CPC ............... *B65G 65/32* (2013.01); *B09B 3/45* (2022.01); *B65G 33/14* (2013.01); *B65G 2814/0326* (2013.01)

(58) Field of Classification Search
None
See application file for complete search history.

(56) References Cited

U.S. PATENT DOCUMENTS

| 4,864,942 A | * | 9/1989 | Fochtman | ............ C02F 11/004 |
| | | | | 110/341 |
| 4,977,839 A | * | 12/1990 | Fochtman | ................. B09B 3/45 |
| | | | | 48/209 |
| 5,052,858 A | * | 10/1991 | Crosby | .................... B09C 1/06 |
| | | | | 405/128.85 |
| 5,099,986 A | * | 3/1992 | Kuzub | ................... B65G 33/16 |
| | | | | 198/666 |

(Continued)

FOREIGN PATENT DOCUMENTS

DE        259101        2/1911
EP        0181038 A2    5/1986
(Continued)

*Primary Examiner* — Kavel Singh
(74) *Attorney, Agent, or Firm* — Hayes Soloway PC

(57) ABSTRACT

The object of the present invention relates to a rotating drum for infeeding material by gravity to its interior, which can be used both inside a vessel that could be subjected to pressure or not, such as for example for the treatment of solid waste with water vapour, and externally for all types of equipment that require infeeding material to a rotating drum for the transportation and tumbling thereof, wherein due to the special configuration thereof it does not require an independent device for infeeding material to the rotating drum.

17 Claims, 1 Drawing Sheet

(56) References Cited

U.S. PATENT DOCUMENTS

| | | | | |
|---|---|---|---|---|
| 5,222,591 A | * | 6/1993 | Bertola | ................ B65G 33/14 198/672 |
| 7,303,160 B2 | | 12/2007 | Bouldin et al. | |
| 2020/0359596 A1 | * | 11/2020 | Jagan | ................ B05B 13/0235 |

FOREIGN PATENT DOCUMENTS

| | | |
|---|---|---|
| EP | 2519362 | 7/2012 |
| GB | 2188567 A | 10/1987 |
| WO | 2011079853 A1 | 7/2011 |
| WO | 2014041373 A2 | 3/2014 |

* cited by examiner

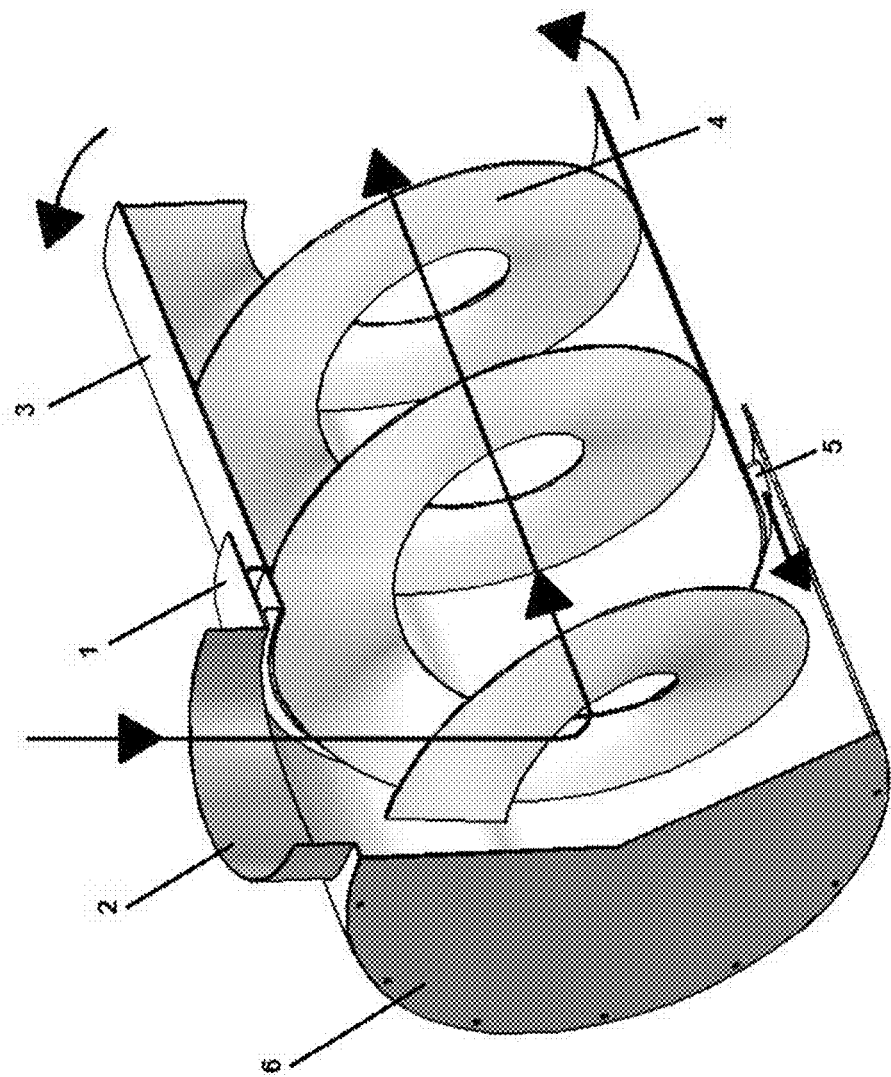

ROTATING DRUM FOR GRAVITY FEEDING MATERIAL INTO ITS INTERIOR

CROSS-REFERENCE TO RELATED APPLICATIONS AND PRIORITY

This patent application claims priority from PCT Patent Application No. PCT/ES2018/1070677 filed Oct. 17, 2018. This patent application is herein incorporated by reference in its entirety.

OBJECT OF THE INVENTION

The object of the present invention is a rotating drum for infeeding material by gravity to its interior.

The rotating drum of the present invention can be used both inside a vessel that could be subjected to pressure or not, such as for example for the treatment of solid waste with water vapour, and externally for all types of equipment that require infeeding material to a rotating drum for the transportation and tumbling thereof.

Due to the special configuration thereof, the rotating drum enables the infeeding of material by gravity to its interior without needing to use an independent device.

BACKGROUND OF THE INVENTION

The devices for carrying out the treatment of waste are known in the state of the art.

Among the prior art the European patent with publication number EP2519362A1 of this same applicant is known, relating to a device for continuously treating waste, comprising a pressure tank wherein the material to be treated is placed, wherein the tank comprises a first helical blade which causes the material to move through the tank in a substantially continuous and uninterrupted manner with a first helical blade through a first inner flow path in the tank in a first axial direction and with a second helical blade through a second outer flow path in a second axial direction opposite to the first axial direction, the first and second flow paths being generally concentric.

U.S. Pat. No. 7,303,160B2 is also known, relating to a system for processing waste on a continuous basis comprising an infeed assembly, a vessel held at a non-ambient pressure and/or temperature and an outfeed assembly. The infeed assembly includes: an infeeder where waste is delivered, a gate construction that moves between an open and a closed position, and a ram that moves within the infeeder to compress waste when the gate construction is in the closed position and to push the compressed waste into the vessel. The processed material moves from the vessel to the outfeed assembly, which includes a compaction chamber, a piston that moves within the compaction chamber, and a cutter assembly. Waste is compacted in the compaction chamber by the ram, cut by the cutter assembly, and delivered as a compacted block to an environment having an ambient pressure and/or temperature.

The previous systems have the drawback that the infeeding of the solid waste is carried out by means of an inlet device external to the drum comprising an endless infeeder or a piston-type ram that introduces the waste into the drum, with which said device external to the drum has an associated motor or independent actuation, with the resulting energy consumption, larger space necessary for the facility thereof and, in general, greater complexity of the system increasing the chances of failure.

The rotating drum for infeeding material by gravity to its interior of the present invention solves all the previously mentioned drawbacks.

DESCRIPTION OF THE INVENTION

The present invention relates to a rotating drum for infeeding material by gravity to its interior which can be used both inside a vessel that could subjected to pressure or not, such as for example for the treatment of solid waste with water vapour, and externally for all types of equipment that require infeeding material to a rotating drum for the transportation and tumbling thereof.

The rotating drum for infeeding material by gravity to its interior comprises:
  a static shell comprising an inlet configured to enable the inlet of the material into the rotating drum to be carried out;
  a rotating shell comprising a first helical blade or auger arranged inside said rotating shell, wherein the first helical blade or auger is configured to rotate together with the rotating shell;
wherein the first helical blade or auger is also arranged at least partially inside the static shell.

Optionally, the first helical blade or auger is arranged at least partially in correspondence with the inlet of the static shell.

Optionally, the rotating shell is arranged at least partially inside the static shell.

Optionally, the rotating shell is concentric to the static shell.

Optionally, the rotating shell further comprises a second helical blade or auger arranged externally to said rotating shell, wherein the second helical blade or auger is configured to rotate together with the rotating shell. Preferably, the second helical blade or auger of the rotating shell is arranged occupying the space existing between the rotating shell and the static shell. Optionally, the second helical blade or auger of the rotating shell is oriented inversely to the first helical blade or auger, such that it prevents the inlet of material into the space existing between the rotating shell and the static shell.

Thus, the rotating drum for infeeding material by gravity to its interior has the following advantages:
  It simplifies the equipment by removing the independent device necessary for infeeding the material to the rotating drum.
  It enables the inner diameter of the helical blade or auger to be reduced, increasing the capacity for transportation or reducing the outer diameter of the rotating drum. In the case of a auger of the independent device, which infeeds the material to the drum, it is necessary for the inner diameter of the inner helical blade of the drum to be greater than the outer diameter of the auger of the independent infeed device.
  It removes the bottleneck that implies passing from the smaller diameter of the auger of the independent infeed device to the larger diameter of the drum with an inner helical blade.
  It enables easy access to the end from whence the infeeding of the material to the rotating drum takes place in order to perform cleaning or maintenance operations. In the case of an independent infeed device, it is necessary to disassemble said device to be able to access the inlet of the rotating drum if there is blockage or if cleaning or maintenance tasks need to be performed.

DESCRIPTION OF THE DRAWINGS

In order to complement the description being made and with the object of helping to better understand the features of the invention, in accordance with a preferred practical exemplary embodiment thereof, said description is accompanied, as an integral part thereof, by a set of drawings where, in an illustrative and non-limiting manner, the following has been represented:

FIG. 1.—Shows a diagram of the rotating drum for infeeding material by gravity to its interior of the present invention.

PREFERRED EMBODIMENT OF THE INVENTION

Below, and in a detailed manner, the rotating drum for infeeding material by gravity to its interior of the present invention will be described.

The rotating drum for infeeding material by gravity to its interior comprises:

a static shell (1) comprising an inlet (2) configured to enable the inlet of the material into the rotating drum to be carried out;

a rotating shell (3) comprising a first helical blade or auger (4) arranged inside said rotating shell (3), wherein the first helical blade or auger (4) is configured to rotate together with the rotating shell (3);

wherein the first helical blade or auger (4) is also arranged at least partially inside the static shell (1).

Preferably, the inlet (2) of the static shell (1) is arranged in the upper portion of said static shell (1).

The static shell (1) comprises a cover (6) which prevents the outlet of material which, after falling inside the static shell (1) through the inlet (2), is kited through the first helical blade or auger (4) to the rotating shell (3).

The rotating shell (3) is arranged at least partially inside the static shell, wherein the rotating shell (3) is concentric to the static shell (1).

The rotating shell (3) further comprises a second helical blade or auger (5) arranged externally to said rotating shell (3), wherein the second helical blade or auger (5) is configured to rotate together with the rotating shell (3) and wherein the second helical blade or auger (5) of the rotating shell (3) is arranged occupying the space existing between the rotating shell (3) and the static shell (1), wherein the second helical blade or auger (5) of the rotating shell (3) is oriented inversely to the first helical blade or auger (4) such that it prevents the inlet of materials.

Preferably, both the static shell (1) and the rotating shell (3) are cylindrical.

Preferably, the radius of the static shell (1) with respect to the radius of the rotating shell (3) has a relationship comprised in the interval (1, 1.1).

The invention claimed is:

1. A rotating drum for infeeding material by gravity to its interior comprising:
    a static shell comprising an inlet configured to enable the inlet of the material into the rotating drum to be carried out;
    a rotating shell;
    a first helical blade arranged inside said rotating shell and at least partially inside the static shell, wherein the first helical blade is configured to rotate together with the rotating shell; and
    a second helical blade arranged externally to said rotating shell, wherein the second helical blade is configured to rotate together with the rotating shell and wherein the second helical blade is arranged externally, in a radial direction, to said rotating shell.

2. The rotating drum of claim 1,
    wherein the cantilever section is arranged at least partially in correspondence with the inlet of the static shell.

3. The rotating drum of claim 2, wherein the rotating shell is arranged at least partially inside the static shell.

4. The rotating drum of claim 3, wherein the rotating shell is concentric to the static shell.

5. The rotating drum of claim 1, wherein the second helical blade of the rotating shell is arranged between the rotating shell and the static shell.

6. The rotating drum of claim 1, wherein the second helical blade of the rotating shell is oriented inversely to the first helical blade.

7. The rotating drum of claim 1, wherein both the static shell and the rotating shell are cylindrical.

8. The rotating drum of claim 1, wherein the radius of the static shell with respect to the radius of the rotating shell has a relationship comprised in the interval (1, 1.1).

9. The rotating drum of claim 1, wherein the inlet of the static shell is arranged in an upper portion of said static shell.

10. The rotating drum of claim 1, wherein the static shell comprises a cover configured to prevent the outlet of material that, after falling inside the static shell through the inlet, is infed through the first helical blade to the rotating shell.

11. The rotating drum of claim 1, wherein the first helical blade is arranged at least partially in correspondence with the inlet of the static shell.

12. The rotating drum of claim 3, further comprising a second helical blade arranged externally to said rotating shell, wherein the second helical blade is configured to rotate together with the rotating shell.

13. The rotating drum of claim 4, further comprising a second helical blade arranged externally to said rotating shell, wherein the second helical blade is configured to rotate together with the rotating shell.

14. The rotating drum of claim 5, wherein the second helical blade of the rotating shell is oriented inversely to the first helical blade.

15. The rotating drum of claim 5, wherein both the static shell and the rotating shell are cylindrical.

16. The rotating drum of claim 6, wherein both the static shell and the rotating shell are cylindrical.

17. The rotating drum of claim 1, wherein the first helical blade is a shaftless helical blade.

* * * * *

UNITED STATES PATENT AND TRADEMARK OFFICE
CERTIFICATE OF CORRECTION

PATENT NO. : 11,655,108 B2
APPLICATION NO. : 17/286740
DATED : May 23, 2023
INVENTOR(S) : Jesus Pacheco and Julian Alberto Soler It is certified that error appears in the above-identified patent and that said Letters Patent is hereby corrected as shown below:

In the Claims

Column 4, Claim 3, Line 19, "claim 2" should be --claim 1--.

Signed and Sealed this
Thirtieth Day of April, 2024

*Katherine Kelly Vidal*

Katherine Kelly Vidal
*Director of the United States Patent and Trademark Office*